US008895689B2

(12) United States Patent
Melnyk et al.

(10) Patent No.: US 8,895,689 B2
(45) Date of Patent: Nov. 25, 2014

(54) PRODUCTION OF POLYMERS FROM WASTE COOKING OIL

(75) Inventors: Thomas John Melnyk, Greenfield, MN (US); Gregory B. Hayes, Bowling Green, KY (US)

(73) Assignee: Valspar Sourcing, Inc., Minneapolis, MN (US)

( * ) Notice: Subject to any disclaimer, the term of this patent is extended or adjusted under 35 U.S.C. 154(b) by 1079 days.

(21) Appl. No.: 12/174,987

(22) Filed: Jul. 17, 2008

(65) Prior Publication Data
US 2008/0275192 A1    Nov. 6, 2008

Related U.S. Application Data

(63) Continuation-in-part of application No. PCT/US2007/000855, filed on Jan. 12, 2007.

(60) Provisional application No. 60/761,039, filed on Jan. 20, 2006.

(51) Int. Cl.
| | |
|---|---|
| *C08G 63/60* | (2006.01) |
| *C08G 63/48* | (2006.01) |
| *C08G 63/02* | (2006.01) |
| *C08G 63/16* | (2006.01) |
| *C08G 63/52* | (2006.01) |
| *A23D 7/00* | (2006.01) |
| *A23D 9/00* | (2006.01) |

(52) U.S. Cl.
CPC ..................... *C08G 63/48* (2013.01)
USPC ........ 528/295.5; 528/272; 528/298; 528/302; 528/303; 426/417; 426/601

(58) Field of Classification Search
USPC ............. 528/295.5, 298, 302, 303, 272; 426/417, 601
See application file for complete search history.

(56) References Cited

U.S. PATENT DOCUMENTS

| | | | |
|---|---|---|---|
| 4,133,786 A | 1/1979 | Harris et al. | |
| 4,200,560 A | 4/1980 | Kubo et al. | |
| 4,474,941 A | 10/1984 | Wilk et al. | |
| 4,517,322 A | 5/1985 | Birkmeyer et al. | |
| 6,072,082 A | 6/2000 | Saito et al. | |
| 6,364,917 B1 | 4/2002 | Matsumura et al. | |
| 6,627,700 B1 | 9/2003 | Kadambande et al. | |
| 6,729,805 B2 | 5/2004 | Wathen | |
| 6,946,509 B2 | 9/2005 | He | |
| 2003/0119918 A1 | 6/2003 | Croyle et al. | |
| 2005/0043555 A1* | 2/2005 | Garro et al. | 554/126 |
| 2005/0203218 A1* | 9/2005 | Kuo et al. | 523/507 |
| 2005/0274065 A1 | 12/2005 | Portnoff et al. | |

OTHER PUBLICATIONS

Search Report of European Patent Application No. 07716568 (Counterpart Application) (2 pages).
Vleck, T. et al: "Utilization of New Types of Vegetable Oils for Alkyd Resins Synthesis", Database CA [Online], Chemical Abstracts Service, Columbus, OH, US, Jan. 1, 2004 (2 pages).

* cited by examiner

*Primary Examiner* — Bijan Ahvazi
*Assistant Examiner* — Ronald Grinsted

(57) ABSTRACT

An alkyd resin formed by reacting waste cooking oil, one or more aromatic polycarboxylic acids, aliphatic polycarboxylic acids, or esterified polymerization products, and one or more polyols.

19 Claims, No Drawings

PRODUCTION OF POLYMERS FROM WASTE COOKING OIL

CROSS-REFERENCE TO RELATED APPLICATION(S)

This is a continuation-in-part application of International Application No. PCT/US2007/000855, filed on Jan. 12, 2007 designating the United States, and entitled "Production of Polymers From Waste Cooking Oil", which claims priority to U.S. Provisional Application No. 60/761,039, filed on Jan. 20, 2006, and entitled "Production of Polymers From Waste Cooking Oil", the disclosures of which are incorporated by reference in their entireties.

FIELD

The present invention relates generally to products made using waste vegetable oil.

BACKGROUND

Most restaurants, especially fast food restaurants, use commercial deep frying units to cook food items such as, for example, french fries, chicken, or fish by submersing the food items in hot cooking oil. The cooking oil (typically vegetable oil) has a limited shelf life, as it degrades and becomes contaminated by pieces of food as well as water and fats released from food during the cooking process. As a result, the cooking oil is changed on a regular basis.

Waste cooking oil can pose a pollution hazard if not handled properly. To prevent pollution of waterways and clogging of private and municipal drain systems, restaurants and other food preparation facilities typically save used cooking oil and employ sewage traps to filter grease out of waste water streams. Renderers collect the waste cooking oil, and then use it in products such as animal feed or biodiesel fuel. Yellow and brown grease (also commonly referred to as trap grease, sewage grease, or black grease) are two forms of waste cooking oil that are readily available in bulk quantities. Yellow grease is of a slightly higher quality than brown grease and typically has a free fatty acid (FFA) content of between about 4 and 15 weight percent, while brown grease typically has a FFA content of up to about 60 weight percent. The current supply of yellow and brown grease exceeds the demand for these feedstocks.

Given the ample supply of waste cooking oil and the relatively limited number of products currently being produced from collected waste cooking oil, there is a need for new products derived from waste cooking oil.

SUMMARY

In one embodiment, the present invention provides an environmentally useful method for producing alkyd resins using waste cooking oil as a feedstock. The method includes forming an alkyd resin by reacting waste cooking oil, one or more aromatic or aliphatic polycarboxylic acids, and one or more polyols.

In another embodiment, the present invention provides an alkyd resin for use in coating formulations that is the reaction product of a waste cooking oil, a polyol, and a material selected from the group consisting of an aliphatic polycarboxylic acid, an aromatic polycarboxylic acid, an esterified polymerization product, and combinations thereof.

In yet another embodiment, the present invention provides a composition that is a reaction product of reactants that include waste cooking oil and a solvent selected from water, an organic solvent, or mixtures thereof. The composition is in the form of a coating composition.

DETAILED DESCRIPTION

The present invention provides a method for producing alkyd resin using waste cooking oil as a feedstock. The method includes reacting waste cooking oil, a polyol, and an aromatic or aliphatic polycarboxylic acid, or an esterified polymerization product thereof, to form the alkyd resin. Alkyd resins are used in a variety of coating applications including, for example, paints, varnishes, lacquers, and baked enamels.

Conventional methods for producing alkyd resins utilize oils such as virgin vegetable oils (i.e., vegetable oils that have not been used to prepare food products) or tall oils. In contrast to waste cooking oil, the virgin oils used in conventional alkyd resin production are relatively free of contaminants. It was surprising and unforeseeable that contaminated waste cooking oil could be used as a feedstock for producing commercially acceptable alkyd resins.

Pursuant to the method of the present invention, alkyd resin may be produced using any suitable waste cooking oil. As used herein, the term "waste cooking oil" includes any vegetable oil (e.g., soybean oil, peanut oil, sunflower oil, linseed oil, coconut oil, cottonseed oil, canola oil, corn oil, safflower oil, walnut oil, castor oil, tung oil, etc.), animal fat (e.g., lard, fish oil, poultry fat, tallow, etc.), or byproduct or combination thereof that has been heated to a high temperature and/or used in the preparation of food or other products. The waste cooking oil may be combined or supplemented with virgin vegetable oil and/or any other types of non-cooking waste oil or grease. Waste cooking oils having a variety of levels of saturation or unsaturation may be used to produce the alkyd resins of the present invention. In some embodiments, waste cooking oil having a particular degree of saturation or unsaturation may be desirable, depending upon the intended uses for the resulting alkyd resins. For example, in some embodiments where alkyd coating formulations with air drying properties are desired, the waste cooking oil may include a suitable degree of unsaturation to facilitate crosslinking of the resulting coating formulation.

Yellow grease, brown grease, and combinations thereof are particularly suitable examples of waste cooking oil for use in the present invention due to their availability and cost.

The amount of waste cooking oil included in the reaction mixture of the present invention may vary. In some embodiments, the reaction mixture may contain at least about 10, preferably at least about 20, and more preferably at least about 25 weight percent of waste cooking oil, based on the total weight of reactants (not including any solvents) included in the reaction mixture. In some embodiments, the reaction mixture may contain less than about 65, preferably less than about 50, and more preferably less than about 35 weight percent of waste cooking oil, based on the total weight of reactants (not including any solvents) included in the reaction mixture.

Examples of suitable polyols for use in the present invention include difunctional alcohols, trifunctional alcohols (e.g., glycerine, trimethylol propane, trimethylol ethane, trimethylol butane, tris hydroxyethyl isocyanurate, etc.), tetrahydric or higher alcohols (e.g., pentaerythritol, diglycerol, etc.), and combinations thereof. Trifunctional alcohols are preferred due to the degree of branching they allow. Difunctional alcohols (or diols), if used, are preferably used in combination with trifunctional or higher alcohols. Examples of suitable diols include neopentyl glycol (NPG), ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, 1,3-propanediol, 2,4-dimethyl-2-ethyl-hexane-1,3-diol, 2,2-dimethyl-1,2-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-tetramethyl-1,6-hexanediol, thiodiethanol, 1,2-cyclohexanedimethanol, 1,3-cyclohexanedimethanol, 1,4-cyclohexanedimethanol, 2,2,4-trimethyl-1,3-pentanediol, 2,2,4-tetramethyl-1,3-cyclobutanediol, p-xylenediol, hydroxypivalylhydroxypivalate, 1,10-decanediol, and hydrogenated bisphenol A.

In some embodiments, the reaction mixture contains at least about 10, preferably at least about 20, and more preferably at least about 25 weight percent of polyol, based on the total weight of the reactants (not including any solvents) included in the reaction mixture. In some embodiments, the reaction mixture contains less than about 65, preferably less than about 50, and more preferably less than about 35 weight percent of polyol, based on the total weight of the reactants (not including any solvents) included in the reaction mixture. In an exemplary embodiment, the reaction mixture contains about 2 parts of glycerine per about 1 part of triglycerides from the waste cooking oil. The terms "glycerine," "glycerin", and "glycerol" are used interchangeably herein.

The reaction mixture of the present invention preferably includes one or more aliphatic or aromatic polycarboxylic acids, esterified polymerization products thereof, and combinations thereof. As used herein, the term "polycarboxylic acid" includes both polycarboxylic acids and anhydrides thereof. Examples of suitable polycarboxylic acids for use in the present invention include phthalic acid, isophthalic acid, terephthalic acid, tetrahydrophthalic acid, naphthalene dicarboxylic acid, and anhydrides and combinations thereof. As used herein, the term "esterified polymerization product" refers to a polymerization product of monomers that are capable of being synthesized from esterification or transesterification reactions of one or more polyols and one or more of the above-discussed aliphatic or aromatic polycarboxylic acids. Examples of suitable esterified polymerization products include polyethylene terephthalates. In addition to the waste cooking oil, the esterified polymerization products may also be post-consumer materials.

In some embodiments, the reaction mixture contains at least about 20, preferably at least about 30, and more preferably at least about 35 weight percent of aromatic or aliphatic polycarboxylic acid, or esterified polymerization product, based on the total weight of the reactants (not including any solvents) included in the reaction mixture. In some embodiments, the reaction mixture contains less than about 80, preferably less than about 70, and more preferably less than about 50 weight percent of aromatic or aliphatic polycarboxylic acid, or esterified polymerization product, based on the total weight of the reactants (not including any solvents) included in the reaction mixture.

Alkyd resins produced using the method of the present invention may exhibit any suitable hydroxyl number. Hydroxyl numbers are typically expressed as milligrams of potassium hydroxide (KOH) equivalent to the hydroxyl content of 1 gram of the hydroxyl-containing substance. Methods for determining hydroxyl numbers are well known in the art. See, for example, ASTM D 1957-86 (Reapproved 2001) entitled "Standard Test Method for Hydroxyl Value of Fatty Oils and Acids" and available from the American Society for Testing and Materials International of West Conshohocken, Pa. In some embodiments, the alkyd resins may have a hydroxyl number of at least about 10, and preferably at least about 20. In some embodiments, the alkyd resins may have a hydroxyl number of less than about 175 and preferably less than about 150.

Similarly, alkyd resins of the present invention may exhibit any suitable acid number. Acid numbers are typically expressed as milligrams of KOH required to titrate a sample to a specified end point. Methods for determining acid numbers are well known in the art. See, for example, ASTM D 974-04 entitled "Standard Test Method for Acid and Base Number by Color-Indicator Titration" and available from the American Society for Testing and Materials International of West Conshohocken, Pa. In some embodiments, the alkyd resins may have an acid number of at least about 2, and more preferably at least about 5. In some embodiments, the alkyd resins may have acid numbers of less than about 40, and more preferably less than about 20.

The molecular weight of the alkyd resins of the present invention may vary widely and may be tailored for particular applications. In some embodiments, the alkyd resins have number average molecular weights (Mn) of at least about 500, and preferably at least about 700. In some embodiments, the alkyd resins have Mn of less than about 6,000, and preferably less than about 3,000. The color of the alkyd resins of the present invention may vary depending upon the process conditions. Preferably, the alkyd resins exhibit a color on the Gardner scale of less than about 18, and more preferably less than about 12. In some embodiments, the alkyd resins of the present invention may exhibit a color of as low as about 1 on the Gardner scale. The color of alkyd resin may be tailored for particular configurations. For example, in certain applications where the color of a coating including alkyd resin is not important (e.g., for coating articles that are not normally visible to a user), an alkyd resin exhibiting a color as high as about 18 on the Gardner scale may be acceptable.

Processes for producing alkyd resins from conventional oils are well known in the art. See, for example, U.S. Pat. Nos. 4,133,786, 4,517,322, and 6,946,509. Subject to the discussion before regarding side reactions, any suitable reaction process known in the art may be utilized to produce alkyd resins of the present invention from a waste cooking oil feedstock. The reactants may either be added to a reaction vessel at the same time or added sequentially in any suitable order or grouping(s). One or more time delays may be included between reactant additions. In one embodiment, waste cooking oil, polyol, and aromatic or aliphatic polycarboxylic acid are combined and heated until an alkyd resin having the desired properties is produced. In another embodiment, waste cooking oil and polyol are combined and heated to induce formation of a mixture containing monoglyceride oils. The resulting mixture including the monoglyceride oils may then be reacted with an aromatic or aliphatic polycarboxylic acid. In still another embodiment, polyol and aromatic or aliphatic polycarboxylic acid are reacted and the resulting reaction product is subsequently reacted with waste cooking oil.

Polycondensation (i.e., polymerization/growth of the alkyd resin) is preferably carried out at a temperature of at least about 150° C., and more preferably at a temperature of at least about 200° C. In some embodiments, polycondensation is preferably carried out at a temperature of less than about 280° C., and more preferably at a temperature of less than about 250° C. Water produced during formation of the alkyd resins may be removed using any methods known in the art, including, for example, using distillation columns, distilling under reduced pressures, azeotropic distillation using a suitable organic solvent (e.g., xylene), or combinations thereof. In embodiments involving an esterified polymerization product, the polymerization reaction desirably generates substantially no water as a condensate by-product of the reaction. This is beneficial for providing high yields of reaction, in addition to substantially no by-products for a waste stream (polyethylene terephthalates).

In some embodiments, a catalyst such as, for example, lithium, is included in the reaction mixture to assist in production of alkyd resin. In some embodiments, an inert gas is passed through the reaction mixture.

In some situations, undesirable side reactions may occur if steps are not taken to minimize or eliminate their occurrence. These undesirable side reactions may negatively affect the properties of the alkyd resin (e.g., color, molecular weight, acid number, hydroxyl number, viscosity, etc.), reduce the total yield of alkyd resin, and/or result in the production of undesirable substances.

It has been discovered that, in some embodiments, unsuitable quantities of acrolein may be produced during the production of an alkyd resin using waste cooking oils as a result of a side reaction if steps are not taken to avoid or inhibit the side reaction. While not wishing to be bound by theory, it is thought that a contaminant present in waste cooking oil may cause unsuitable amounts of acrolein to be produced from glycerine. Acrolein (also commonly referred to as 2-propenal) is a lachrymator, which if present in sufficient amounts may adversely affect personnel associated with the alkyd resin production. The acrolein is thought to result from dehydration of the secondary hydroxyl of glycerine.

In some embodiments, the production of acrolein may be eliminated, or reduced to acceptable levels, by protecting the secondary hydroxyl group of glycerine. In an exemplary embodiment, glycerine and one or more aromatic or aliphatic polycarboxylic acids may be reacted prior to the addition of waste cooking oil to protect the secondary hydroxyl of glycerine. While not wishing to be bound by theory, the glycerine and aromatic or aliphatic polycarboxylic acid are believed to form an intermediate that helps prevent dehydration of the secondary hydroxyl of glycerine to form acrolein.

While not wishing to be bound by theory, it is believed that a metal such as, for example, iron may catalyze the acrolein-producing side reaction. To avoid the metal-catalyzed production of acrolein, steps may be taken to either (1) avoid or reduce exposure of the reaction mixture to the metal and/or (2) remove or bind the metal. In some embodiments, glass-lined reaction vessels may be used in place of reaction vessels having metallic surfaces that may contact the reaction mixture. In some embodiments, chelators (e.g., iron-binding chelators) may be added to the reaction mixture to prevent acrolein-producing side reactions catalyzed by the metal.

Coating formulations including alkyd resins are well known in the art. The alkyd resins of the present invention may be used in any such coating formulation. Pursuant to conventional alkyd coating formulations, alkyd resin of the present invention may be combined with organic solvents, water, or combinations thereof. In addition, the coating formulations may include additional additives such as, for example, pigments and crosslinkers.

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following examples are on a weight basis, and all reagents used in the examples were obtained, or are available, from commercial chemical suppliers, or may be synthesized by conventional techniques. The yellow grease used in Examples 1-3 below was stabilized feeding fat yellow grease commercially available from Griffin Industries, Inc. of Cold Spring, Ky.

The acid numbers of the alkyd resins of Examples 1-3 described below were determined pursuant to the methods of ASTM D 974-04 entitled "Standard Test Method for Acid and Base Number by Color-Indicator Titration" and available from the American Society for Testing and Materials International of West Conshohocken, Pa.

Example 1

Laboratory Preparation of an Alkyd Resin with an Alcoholysis Step

A laboratory scale alkyd synthesis was conducted as described below. 1.2 moles of yellow grease and 1.2 moles of glycerin were charged to a 3.0 liter flask equipped with an agitator, packed column, condenser, thermometer, and inert gas inlet. The reactor was flushed with inert gas and heated to 235° C. The reactor was held at 235° C., and the reaction proceeded for one hour under an inert atmosphere. The reaction temperature was then lowered to 185° C., and 4.4 moles ethylene glycol, 0.8 moles 2,2 dimethyl 1,3-propanediol, and 4.6 moles phthalic anhydride were added to the reactor. The reactants were heated to 235° C. over 5 hours while removing water. The batch temperature was held at 235° C. until an acid number of less than 10 and a viscosity (measured as a 70% solution in xylene) of K on the Gardner-Holt scale were achieved.

The final acid number of the resulting alkyd product was 10.0. The final viscosity of the alkyd product measured as an 82.0 wt % solution of the alkyd product in Aromatic 100 solvent was Z3½ on the Gardner-Holt scale. The color of the 82.0 wt % solution of the alkyd product as measured on the Gardner scale was 12 and the solution was free of haze.

Example 2

Pilot Reactor Preparation of Pilot Batch with Alcoholysis Step

The process of Example 1 was scaled-up for use in a stainless-steel-walled pilot reactor. 15.8 kg of glycerin and 49.2 kg of yellow grease were charged to a pilot reactor equipped with an agitator, packed column, condenser, thermometer, and inert gas inlet. The reactor was flushed with inert gas and heated to 235° C. The reactor was held at 235° C., and the reaction proceeded for one hour under an inert atmosphere. The reaction temperature was then lowered to 185° C., and 37.7 kg of ethylene glycol, 10.9 kg of 2,2 dimethyl, 1,3-propanediol, and 93.8 kg of phthalic anhydride were added to the reactor. The reactants were heated to 235° C. over 3.5 hours while removing water. During this time, undesirable levels of acrolein production were observed.

An in-process test yielded an acid number of 17 and a viscosity (measured as a 70 wt % solution of the alkyd product in xylene) of Q (Gardner Holt Scale). The color of the alkyd product in xylene as measured on the Gardner color scale was off scale (i.e., greater than 18). In an attempt to improve one or more properties of the alkyd product, 2.7 kg of additional ethylene glycol was added to the reactor to compensate for the loss of glycerin due to dehydration of the glycerin to acrolein. The batch temperature was held at 235° C. until the alkyd product exhibited an acid number of less than 10 and a viscosity of N (Gardner Holt scale). The final acid number for the alkyd product was 5.0. The final viscosity of the alkyd product (measured as an 84.0 wt % solution of the alkyd product in Aromatic 100 solvent) was Z5 (Gardner-Holt scale). The color of the 84.0 wt % alkyd solution as measured on the Gardner color scale was off scale (i.e., greater than 18).

Example 3

Pilot Plant Preparation of an Alkyd Resin without an Alcoholysis Step

The process of Example 2 was modified to address the acrolein production encountered in Example 2. 15.8 kg of glycerin; 10.9 kg of 2,2 dimethyl 1,3-propanediol; 37.7 kg of ethylene glycol; and 93.8 kg of phthalic anhydride were charged to a pilot reactor equipped with an agitator, packed column, condenser, thermometer, and inert gas inlet. The reactor was flushed with inert gas and was heated to 160° C. At 160° C., 49.2 kg of yellow grease were charged to the reactor. The reactants were heated to 235° C. over 5 hours while removing water. The batch temperature was held at 235° C. until an acid number of less than 10 was achieved, a viscosity (measured as a 70% solution in xylene) of K (Gardner Holt Scale) was achieved, and the alkyd product was free of haze. The reaction was held an additional hour at 235° C. to ensure complete transesterification. Unlike the process of Example 2, undesirable acrolein production was not observed during production of the alkyd product.

The final acid number of the resulting alkyd product was 5.3. The final viscosity of the alkyd product measured as an 83.6 wt % solution of the alkyd product in Aromatic 100 solvent was Z4+ on the Gardner-Holt scale. The color of the 83.6 wt % solution of the alkyd product as measured on the Gardner scale was 12 and the solution was free of haze.

Thus, as described above, the present invention provides a method for producing alkyd resins using a waste cooking oil feedstock. Waste cooking oil, a polyol, and a polycarboxylic acid are reacted to form the alkyd resins of the present invention.

Example 4

Laboratory Preparation of an Alkyd Resin with a Esterified Polymerization Product A 2.0 liter reactor flask was charged with 255 grams of yellow grease, 56 grams of neopentyl glycol, 82 grams of glycerin, and 1 part by weight dibutyl tin oxide, where the reactor flask was equipped with an agitator, condenser, thermometer, and inert gas inlet. The reactor flask was flushed with inert gas and the reactor heated to 90° C. 303 grams of post consumer polyethylene terephthalate was then added incrementally over a 15 minute period. The temperature was then increased to 230° C. and was held for 2 hours until the resulting reaction mixture was clear.

After the reaction mixture was clear, the temperature was lowered to 160° C. and an additional 303 grams of post consumer polyethylene terephthalate was added to the reactor flask. The temperature was then raised to 235° C. and held for 4 hours until a clear sample was obtained when diluted to 80% non-volatile material (NVM) with Aromatic 100 solvent. The temperature was then lowered to 110° C., and 166 grams of 2-butoxyethyl acetate (Ektasolve EB acetate) solvent and 166 grams of Aromatic 100 solvent were added. The polymerization reaction generated substantially no water as a condensate by-product of the reaction. Thus, the polymerization reaction with the esterified polymerization product (i.e., polyethylene terephthalate) provided high yields of reaction in addition to substantially no by-products for a waste stream.

Although the present invention has been described with reference to preferred embodiments, workers skilled in the art will recognize that changes may be made in form and detail without departing from the spirit and scope of the invention.

The invention claimed is:

1. A method, consisting essentially of the steps of:
providing waste cooking oil that is a reaction product of at least one vegetable oil, at least one animal fat, byproducts thereof, or combinations thereof, that has been heated and used in preparation of food, other products or combinations thereof, such that the waste cooking oil comprises at least one contaminant and at least about 4% by weight of free fatty acids;
providing an aromatic or aliphatic polycarboxylic acid;
providing a polyol; and
reacting the above reactants to form an alkyd resin in a manner that reduces or prevents acrolein production.

2. The method of claim 1, wherein the waste cooking oil is selected from the group consisting of yellow grease, brown grease, and combinations thereof.

3. The method of claim 1, wherein the polyol comprises glycerine.

4. The method of claim 1, wherein the aromatic or aliphatic polycarboxylic acid is selected from a group consisting of phthalic acid, isophthalic acid, terephthalic acid, tetrahydrophthalic acid, naphthalene dicarboxylic acid, anhydrides thereof, and combinations thereof.

5. The method of claim 1, wherein reacting the reactants to form the alkyd resin comprises:
reacting the polyol with the aromatic or aliphatic polycarboxylic acid to form a reaction product; and
reacting the waste cooking oil with the reaction product.

6. The method of claim 1, and further comprising:
combining the alkyd resin with a solvent selected from a group consisting of water, an organic solvent, and combinations thereof.

7. The method of claim 1, wherein the alkyd resin exhibits a hydroxyl number of between about 10 and about 150.

8. The method of claim 1, wherein the alkyd resin exhibits an acid number of between about 2 and 40.

9. The method of claim 1, wherein the alkyd resin exhibits a number average molecular weight (Mn) of between about 500 and about 6,000.

10. The method of claim 1, wherein the reactants comprise between about 10 and about 65 weight percent of the polyol, based on a total weight of the reactants.

11. The method of claim 1, wherein the reactants comprise between about 10 and about 65 weight percent of the polyol, based on a total weight of the reactants.

12. The method of claim 1, wherein the reactants comprise between about 20 and about 80 weight percent of the aromatic or aliphatic polycarboxylic acid, based on a total weight of the reactants.

13. The method of claim 12, wherein reacting the reactants to form the alkyd resin comprises
reacting the aromatic or aliphatic polycarboxylic acid and the polyol to form a reaction product; and
reacting the reaction product with the waste cooking oil.

14. The alkyd resin produced by the method of claim 1.

15. A method comprising the steps of:
providing waste cooking oil that is a reaction product of at least one vegetable oil, at least one animal fat, byproducts thereof, or combinations thereof, that has been heated and used in preparation of food, other products or combinations thereof, such that the waste cooking oil comprises at least one contaminant and at least about 4% by weight of free fatty acids;

providing a material comprising an aliphatic polycarboxylic acid, an aromatic polycarboxylic acid, an esterified polymerization product, or a combination thereof;

providing a polyol; and reacting the above reactants to form an alkyd resin in a manner that reduces or prevents acrolein production.

16. The method of claim 15, wherein the waste cooking oil is selected from the group consisting of yellow grease, brown grease, and combinations thereof.

17. The method of claim 15, wherein reacting the reactants to form the alkyd resin comprises:

reacting the polyol with the material to form a reaction product; and reacting waste cooking oil with the reaction product.

18. The method of claim 15, and further comprising combining the alkyd resin with a solvent selected from a group consisting of water, an organic solvent, and combinations thereof.

19. The method of claim 15, wherein the reactants comprise between about 10 and about 65 weight percent of the waste cooking oil, based on a total weight of the reactants.

* * * * *